(12) United States Patent
Beck et al.

(10) Patent No.: US 6,618,635 B1
(45) Date of Patent: Sep. 9, 2003

(54) PROGRAMMING APPARATUS

(75) Inventors: Hans-Joachim Beck, Rheinstetten (DE); Gabriele Mangler, Nürnberg (DE); Ingo Weber, Karlsruhe (DE); Peter Hornung, Franklin Park, NJ (US)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/462,195

(22) PCT Filed: Jul. 3, 1998

(86) PCT No.: PCT/DE98/01853

§ 371 (c)(1),
(2), (4) Date: May 1, 2000

(87) PCT Pub. No.: WO99/01803

PCT Pub. Date: Jan. 14, 1999

(30) Foreign Application Priority Data

Jul. 3, 1997 (DE) .......................... 197 28 476

(51) Int. Cl.⁷ .............................. G06B 19/42
(52) U.S. Cl. .............. 700/86; 700/17; 700/18; 700/83; 700/87; 700/88; 700/23; 717/100; 717/101; 717/166; 717/167; 318/568.1; 318/568.25; 901/3; 901/4; 901/5
(58) Field of Search .................. 700/17, 18, 23, 700/83, 86, 87, 88, 89; 717/100, 101, 166, 167; 318/568.1, 568.25; 901/3, 4, 5

(56) References Cited

U.S. PATENT DOCUMENTS 4,029,952 A * 6/1977 Giras et al. ............... 700/287
4,307,447 A * 12/1981 Provanzano et al. ......... 700/1
4,484,303 A * 11/1984 Provanzano et al. ....... 712/37
5,103,401 A * 4/1992 Johnson ................. 700/240
5,644,487 A * 7/1997 Duff et al. ............... 700/56

FOREIGN PATENT DOCUMENTS

| DE | 297 10 751 | 10/1997 |
| GB | 2 289 554 | 11/1995 |
| WO | WO 95/27236 | 10/1995 |

OTHER PUBLICATIONS

Peter Brich et al., "PG 740: High Performance im neuen Kleid", Engineering & Automation 16 (1994), pp. 7–8***.

Gerd Schneider et al., "Tools zur Prozeβvisualisierung–Eine Marktübersicht", Elektronik Mar. 1995, pp. 80–82***.

Hans Berger "Automatisieren mit SIMATIC S5–115U", 1195*.

* cited by examiner

*Primary Examiner*—Ramesh Patel
(74) *Attorney, Agent, or Firm*—Staas & Halsey LLP

(57) ABSTRACT

A programming apparatus having an arrangement for formulating an automating task to be performed in the form of a programming language for automating apparatuses is described, which simplifies a process error analysis for an analysis unit. For this purpose, the programming apparatus is provided with an arrangement that store operands (9; 27), marked to be monitored, in the order in which they appear in the network in a logic list. Furthermore, the programming apparatus has an arrangement that store the operands of this network in an operand list in the order in which they appear in the network. The lists can be transferred into the analysis unit for analysis.

7 Claims, 3 Drawing Sheets

PROGRAMMING APPARATUS

FIELD OF THE INVENTION

The present invention relates a programming apparatus having arrangement for formulating an automation task to be performed in the form of a programming language for automation apparatuses, in particular a programming language allowing a function plan graph and/or an instruction list and/or a contact plan to be displayed on a display unit, the function plan diagram and/or instruction list and/or contact plan being provided with at least one network having operands and their logic operations and the arrangement generating a control program from the automating task formulated, which can be run on an automation apparatus, for controlling an industrial process. Furthermore, the present invention relates an analysis unit for analyzing a process error in a network.

BACKGROUND INFORMATION

A programming apparatus such as the above-described is described in the publication "Automatisieren mit SIMATIC S5-115U" (Automating with SIMATIC S5-115U) by Hans Berger, 1995. A user can also formulate the mode of process monitoring in addition to formulating the automating task. Both the subprogram thus formulated for process monitoring and the subprogram thus formulated for automating are components of a user program, which is compiled using a suitable compiler and finally transferred into a control program that can be run in an automating apparatus in the form of such a control program. Because the process monitoring task is formulated together with the automation task, the user program is difficult to read and unclear if subprogram branching frequently occurs.

German Utility Application 297 10 751.8, describes that designing process monitoring be made possible through the selection and marking of operands, for example, of a contact plan that can be displayed on a display unit, the selected and marked operands being transferred into a process monitoring program via a program interface.

SUMMARY

An object of the present invention is to provide a programming apparatus of the type named in the preamble that would simplify process error analysis by an analysis unit.

This object is achieved by the features provided according to the present invention.

By separating the operands and operations (logical operations) that can be stored in an operand list and in a logic list, a process error can be analyzed at any time in an analysis unit, which can be a component of the programming apparatus. The only requirement is that the status of each operand of the network provided with the marked operands be detected. The status of the operands is detected during the processing cycles in the control mode of the automation apparatus, whereby it is ensured that process error analysis can be performed with the operand values that were present at the time the process error appeared.

In one embodiment of the present invention, the automating apparatus can basically process the actual control program due to the fact that the status of the operands is only input in the event of an error or after predefinable points in time.

In one embodiment of the present invention, process monitoring can be designed in the same context as the formulation of the automating task, the user concentrating basically on achieving the actual object, namely the formulation of this automating task.

In another embodiment of the present invention, the design measures can be clearly represented on a display device, thus largely avoiding design errors.

Due to the fact that, by marking an operand, a parameter mask assigned to this operand can be displayed on the display unit, with at least one monitoring criterion of the operand being defined by parameters, design is simplified and design costs are reduced.

DETAILED DESCRIPTION

Figure 1:
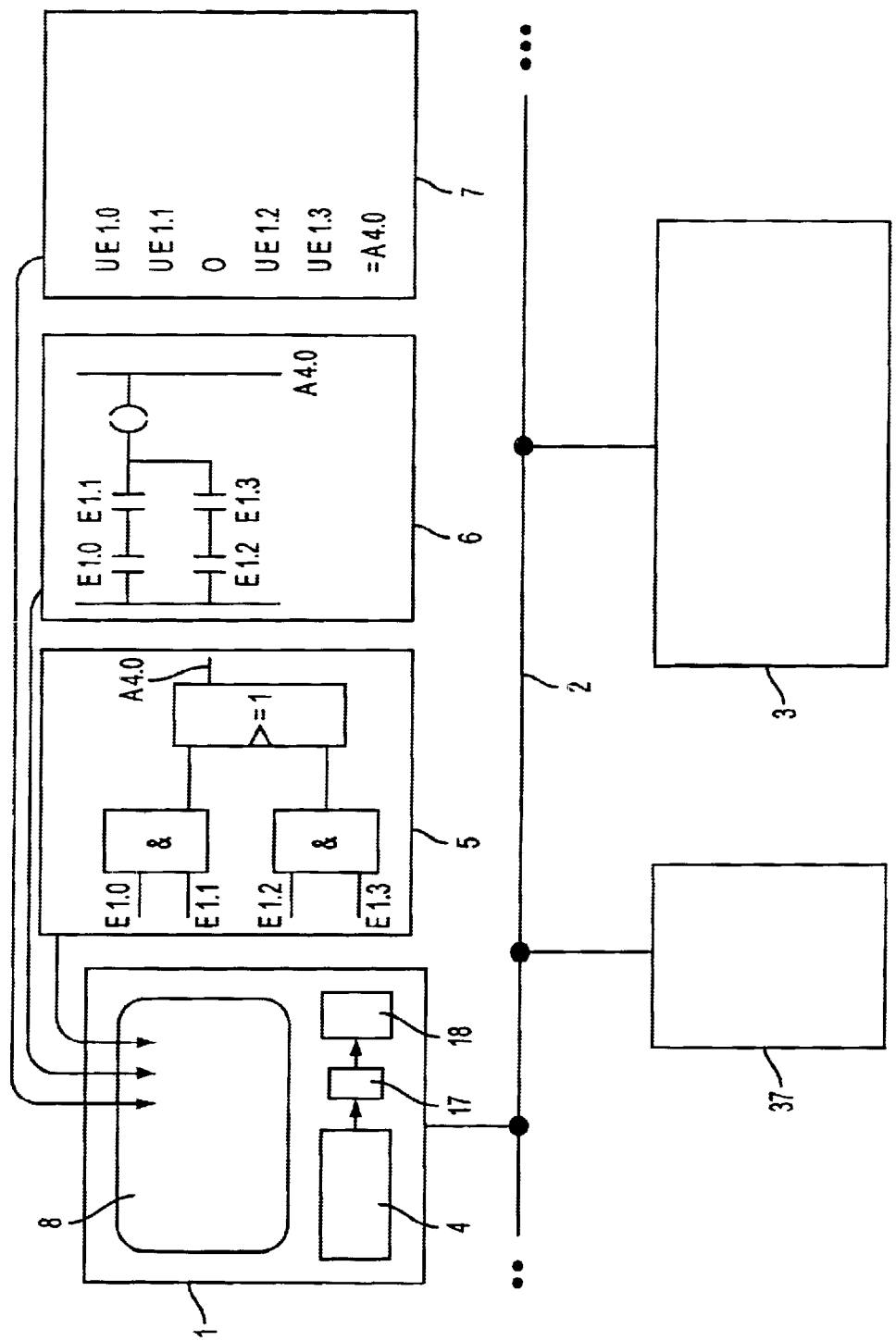
FIG. 1 shows the components of an automating system.

In FIG. 1, a programming apparatus 1 is connected to an automating apparatus 3 and an analysis unit 37 via a system bus 2 having address lines, data lines, and control lines. Other components of the automating systems, e.g., operating and monitoring devices, peripherals, or other automating apparatuses are not shown for the sake of simplicity and are not needed for elucidating the present invention. The programming apparatus is provided with an arrangement 4 in the form of a processor, a memory, and a software tool, which are provided for formulating an automation task to be performed in the form of a programming language. Usually a programming language, which allows a user program to be displayed in a function plan diagram 5 and/or in a contact plan diagram 6 and instruction list 7 is used for formulating an automating task. Function diagram 5, contact plan 6, and instruction list 7 can be displayed on a display unit 8 of programming apparatus 1, with the arrangement 4 of programming apparatus 1 translating the automating task thus formulated into an appropriate control program and transferring it into a memory of automating apparatus 3 on line via system bus 2. Transfer can, of course, be also accomplished off-line using a suitable data medium, on which the control program can be stored; this medium can be inserted in a medium drive of automating apparatus 3 and automating apparatus 3 inputs the control program from this medium. The control program that can be run on automating apparatus 3 is provided for controlling an industrial process, apporiate function modules in the automating apparatus, suitable sensors and/or actuators, as well as final controlling elements affect the industrial process under the control of the control program.

Figure 2:
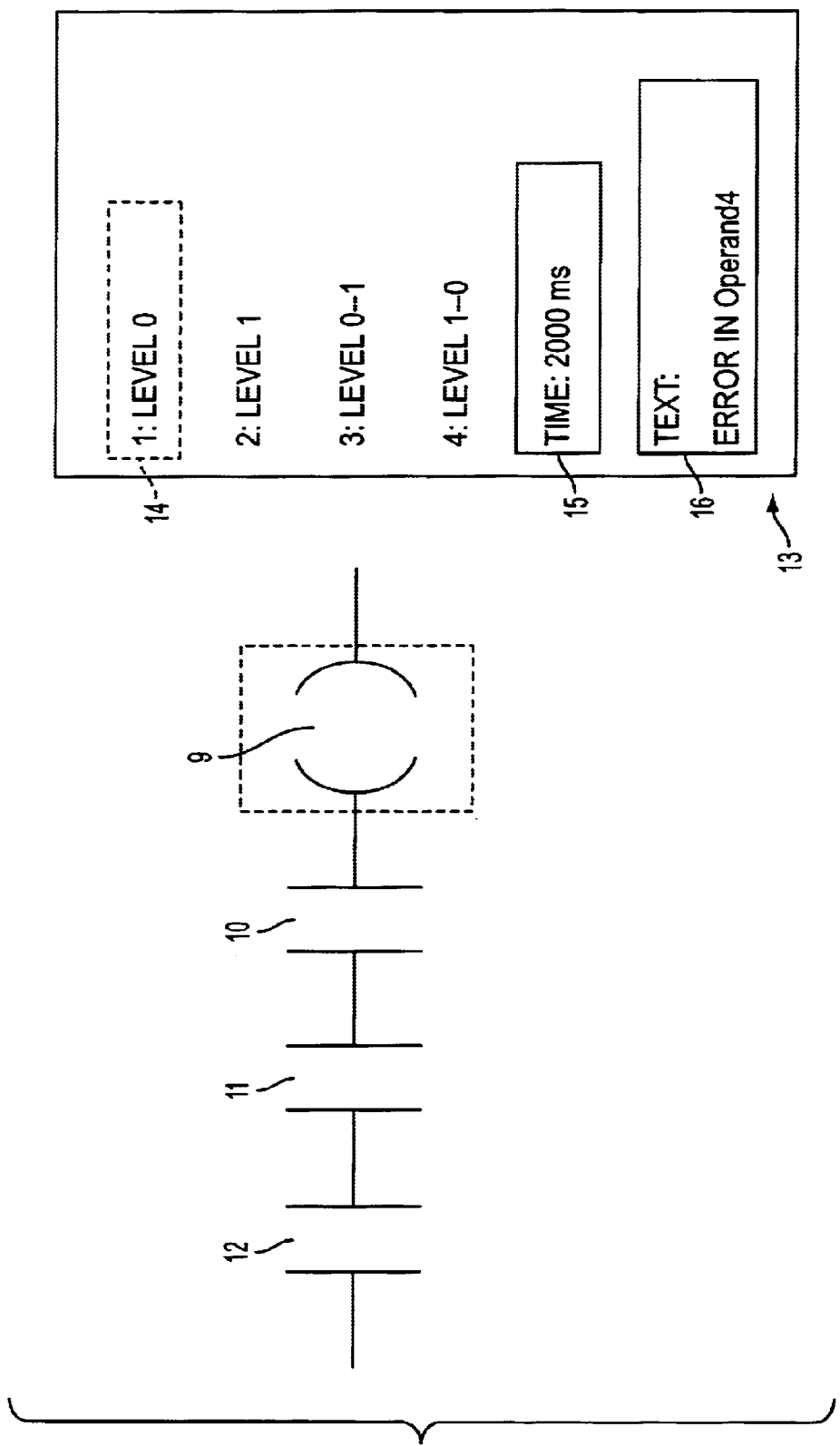
FIG. 2 shows a contact plan of an automating program and an operand parameter mask.

Below, reference is made to FIG. 2, where a contact plan of a simple automating program and an operand parameter mask are represented. It is assumed that a user processes a process element, in the present example, an operand 9, while the automating program is being produced. At this time, a designer- operator can monitor the process by selecting operand 9 using an operating element, e.g., an operating element in the form of a mouse, and marking this operand, which is displayed in the present example via a display attribute in the form of a broken-line frame of operand 9. Of course, color-coded marking is also possible. In the present example, process monitoring is limited to monitoring operand 9. After the user has selected and marked operand 9, a parameter mask 13 corresponding to operand 9 appears on display unit 8 of programming apparatus 1, in which the user can define monitoring criteria. In the present example, it is established that when the level of operand 9 has zero value for a period of 2000 ms, an error message is displayed on display unit 8. For this purpose, the user has marked a field 14, which is also illustrated by a broken-line frame, and the delay time of 2000 ms is input in a field 15. The user defines the type of error message to be output. For this purpose, the user writes a text in a text field 16, which is to be displayed in the event of an error in display unit 8.

Figure 3:
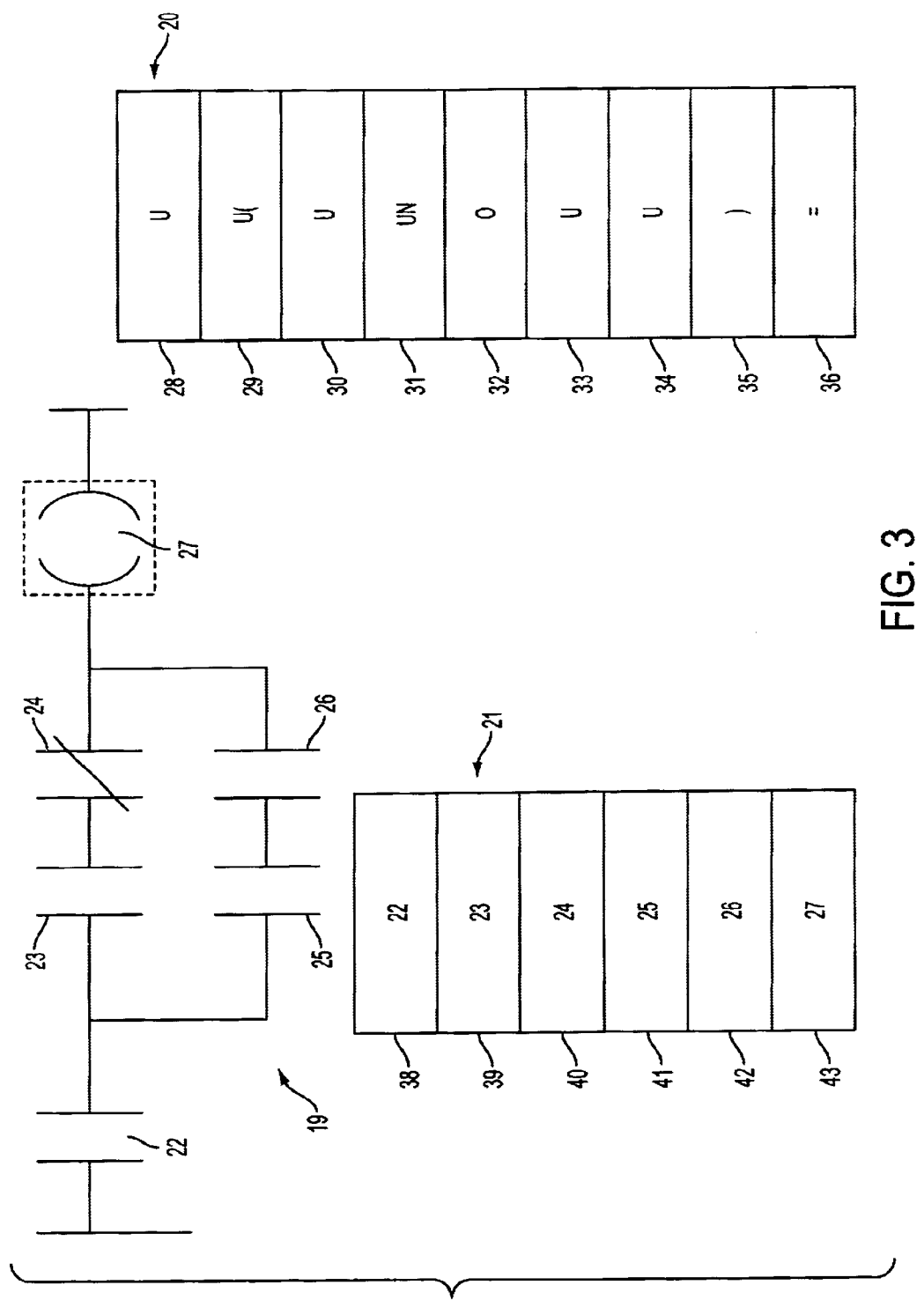
FIG. 3 shows another contact plan, an operand list and a logic list.

The selected and marked operand 9 is transferred, after completion of the design work, together with the parameters, which the user has input in the parameter mask, to a process monitoring program 18 in programming apparatus 1 by the arrangement 4 via program interface 17 (FIG. 1). Program interface 17 and process monitoring program 18 can be parts of means 4 of programming apparatus 1. As is described below, process monitoring program 18 prepares a logic list and an operand list on the basis of the marked operand 9. FIG. 3 shows another contact plan 19 and a logic list 20, as well as an operand list 21.

It is assumed that an operand 27 is to be monitored and a user has marked this operand 27 (in contact plan 19 represented by a broken line). Subsequently the arrangement 4 transfer the operand and its operations in network 19 to process monitoring program 18. Process monitoring program 18 stores the logic operators of network 19, which has marked operand 27, in the order they appear in network 19 in logic list 20 and transfers them into an analysis unit 37 (FIG. 1). Furthermore, process monitoring program 18 stores operands 22, 23, 24, 25, 26, and 27 of network 19, which includes marked operand 27, in the order they appear in network 19 into operand list 21 and transfers the latter into automating apparatus 3 (FIG. 1). In the present example, the level of operand 27 is "1" when the level of operands 22, 23, and 24 is "1" or the level of operands 22, 25, ad 26 is "1." The logic operations of the operands are stored as described in the publication "Automatisieren mit SIMATIC S5-115U" (Automating with SIMATIC S5-115U) by Hans Berger, 1995, in logic list 20, the operands on which the operations are to be applied being stored in operand list 21. In that example the AND operation in field 28 is to be used on operand 22 (field 38), the AND operation in field 29 and in field 35 belonging to field 29 is to be used either on the result of the operation of the AND and NOT-AND operations of operands 23 and 24 in fields 39 and 40 (see AND and NOT-AND operations in fields 30, 31) or (see OR operation in field 32) on AND operations of operands 25 and 26 in fields 41, 42 (see AND operations in fields 33, 34). The result of the operations, i.e., the level of operand 27, is stored in field 43.

During processing cycles in control mode, automating apparatus 3 inputs the status of operands 22–27 in operand list 21 in the event of an error or in time intervals defined by the user. It is now assumed that a process error occurs during a processing cycle and the level of operand 27 has an inadmissible level zero, for example. The reason for this error can be analyzed by initially transferring operand list 21 into analysis unit 37 (FIG. 1). Analysis unit 37 reconstructs network 19 from logic list 20 and operand list 21 and determines which of operands 22–26 is responsible for the erroneous zero level of operand 27.

Using the present invention, advantageously only those data are detected which are necessary for the network to be analyzed. The status of the individual operands in the event of an error can be retrieved by the analysis unit at any later time; the operand list is then preferably input by the analysis unit when the bus load is lowest.

What is claimed is:

1. A programming apparatus, comprising:
a first arrangement formulating an automation task to be performed in a form of a programming language for an automating apparatus, the programming language allowing display, on a display unit, of at least one of: i) a function plan diagram, ii) an instruction list, and iii) a contact plan, the at least one of the function plan diagram, the instruction list and the contact plan being provided with at least one network having operands and corresponding logic operators, the first arrangement generating from the formulated task a control program for execution on the automating apparatus for controlling an industrial process, the first arrangement allowing a process monitoring to be configured through a selection and marking of selected operands in the network; and a process monitoring program storing in a logic list corresponding ones of the logic operators of the network which correspond to the marked ones of the operands, the corresponding ones of the logic operators being stored in an order in which the corresponding ones of the logic operators appear in the network, the logic list being transferrable to an analysis unit, the process monitoring program further storing the marked ones of the operands in an operand list in an order in which the marked ones of the operands appear in the network, the operand list being transferrable into the automating apparatus, the automating apparatus inputting status of the operands in the operand list during processing cycles in a control mode, the operand list with the status of the operands being transferrable into the analysis unit for analysis of a process error.

2. The programming apparatus according to claim 1, wherein an instantaneous status of the operands in the operands list is input during the processing cycles in the control mode in one of: i) an event of an error, and ii) predefined time intervals.

3. The programming apparatus according to claim 1, wherein the operands in the network are selectable and markable during the formulation of the automating task.

4. The programming apparatus according to claim 1, wherein the marking of the selected operands is displayable one the display unit via a display attribute.

5. The programming apparatus according to claim 4, wherein the display attribute is a predefined color.

6. The programming apparatus according to claim 1, wherein a parameter mask assigned to one of the operands is displayable on the display unit as a function of the marking of the one of the operands, at least one monitoring criterion of the one of the operands being definable via parameters.

7. An analysis arrangement, comprising:
an analysis unit analyzing a process error;
a logic list transferred to the analysis unit via an automating apparatus, the logic list storing logic operations in an order in which the logic operations appear in a network having operands marked by a programming apparatus for process monitoring; and
an operand list transferred to the analysis unit via the programming apparatus, the operand list storing the marked operands in an order in which the marked operands appear in the network, the automating apparatus entering status of each of the marked operands in the operand list during processing cycles in a control mode, the logic list and the operand list being readable by the analysis unit for the analysis of the process error, the analysis unit reconstructing the network from the logic operations stored in the logic list and states of the marked operands in the operand list.

* * * * *